United States Patent
Takamiya et al.

(10) Patent No.: US 10,674,103 B2
(45) Date of Patent: Jun. 2, 2020

(54) SOLID-STATE IMAGING DEVICE, IMAGE PICKUP APPARATUS, AND ELECTRONIC DEVICE

(71) Applicant: SONY CORPORATION, Tokyo (JP)

(72) Inventors: Kenichi Takamiya, Kanagawa (JP); Yasunori Tsukuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/092,062

(22) PCT Filed: Mar. 31, 2017

(86) PCT No.: PCT/JP2017/013508
§ 371 (c)(1),
(2) Date: Oct. 8, 2018

(87) PCT Pub. No.: WO2017/179443
PCT Pub. Date: Oct. 19, 2017

(65) Prior Publication Data
US 2019/0124287 A1    Apr. 25, 2019

(51) Int. Cl.
*H04N 5/374*  (2011.01)
*H04N 5/376*  (2011.01)
*H04N 5/3745* (2011.01)
*H04N 5/369*  (2011.01)

(52) U.S. Cl.
CPC ......... *H04N 5/37455* (2013.01); *H04N 5/379* (2018.08); *H04N 5/3765* (2013.01)

(58) Field of Classification Search
CPC ... H04N 5/37455; H04N 5/379; H04N 5/3765
See application file for complete search history.

(56) References Cited

U.S. PATENT DOCUMENTS

| | | | |
|---|---|---|---|
| 2013/0016260 A1* | 1/2013 | Maruta | H04N 5/374 348/294 |
| 2013/0335609 A1 | 12/2013 | Higuchi et al. | |
| 2015/0237282 A1 | 8/2015 | Shimada | |

FOREIGN PATENT DOCUMENTS

| | | |
|---|---|---|
| CN | 103477629 A | 12/2013 |
| CN | 104869290 A | 8/2015 |
| EP | 2693742 A1 | 2/2014 |
| JP | 2015-156581 A | 8/2015 |
| JP | 2015-231051 A | 12/2015 |

(Continued)

OTHER PUBLICATIONS

International Search Report and Written Opinion of PCT Application No. PCT/JP2017/013508, dated Jun. 13, 2017, 6 pages of ISRWO.

*Primary Examiner* — Shahbaz Nazrul
(74) *Attorney, Agent, or Firm* — Chip Law Group

(57) ABSTRACT

The present disclosure relates to a solid-state imaging device, an image pickup apparatus, and an electronic device capable of stably supplying high-speed control signals and clock signals. In the area AD method in which analog-digital conversion of a pixel signal is performed for each ADC area corresponding to a pixel group including a plurality of pixels, a repeater element is regularly arranged in each area group unit including one or more ADC areas, to re-drive control signals for controlling a plurality of the ADC areas. The present disclosure is applicable to a solid-state imaging device.

9 Claims, 16 Drawing Sheets

(56) References Cited

FOREIGN PATENT DOCUMENTS

| | | | |
|---|---|---|---|
| JP | 5835318 | B2 | 12/2015 |
| WO | 2012/133192 | A1 | 10/2012 |
| WO | 2015/186509 | A1 | 12/2015 |

* cited by examiner

FIG. 9

| CONTROL SIGNAL | | AREA NUMBER | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| BLOCK NAME | SIGNAL NAME | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| LOAD MOS | Asignal_D1 | | | | | | | | | | | | | | | | | | | | | | | ● | | | | | | | |
| | Asignal_D2 | | | | | | | | | | | | | | | | | | | | | | | | ● | | | | | | |
| | Asignal_P1 | | | | | | | | | | | | | | | | | | | | | | | | | | | | ● | | |
| | Asignal_P2 | | | | | | | | | | | | | | | | | | | | | | | | | | | | | ● | |
| COMPARATOR | Asignal_D3 | | | | | | | | | | | | | | | ● | | | | | | | | | | ● | | | | | |
| | Asignal_D4 | | | | | | | | | | | | | | | | | | | | | | | | | | ● | | | | |
| | Asignal_P3 | | | | | | | | | | ● | | | | | | | | | | ● | | | | | | | | | | |
| | Asignal_P4 | | | | | | | | | | | ● | | | | | | | | | ● | | | | | | | | | | |
| COUNTER | Dsignal_P1 | | | | | | | | | | | | | ● | ● | | | | | | | | | | | | ● | | | | |
| | Dsignal_P2 | | | | | | | | | | | | | | ● | | | | | | | | | | | | | ● | | | |
| | Dsignal_P3 | | | | | ● | | | | | | | | | ● | | | | | | | | | | | | | ● | | | |
| | Dsignal_C1 | | | | | | | | | | | | ● | | | | | | ● | | | | | | | ● | | | | | ● |

SOLID-STATE IMAGING DEVICE, IMAGE PICKUP APPARATUS, AND ELECTRONIC DEVICE

CROSS REFERENCE TO RELATED APPLICATIONS

This application is a U.S. National Phase of International Patent Application No. PCT/JP2017/013508 filed on Mar. 31, 2017, which claims priority benefit of Japanese Patent Application No. JP 2016-081034 filed in the Japan Patent Office on Apr. 14, 2016. Each of the above-referenced applications is hereby incorporated herein by reference in its entirety.

TECHNICAL FIELD

The present disclosure relates to a solid-state imaging device, an image pickup apparatus, and an electronic device, and more particularly, to a solid-state imaging device, an image pickup apparatus, and an electronic device capable of stably supplying high-speed control signals.

BACKGROUND ART

In the area analog-digital conversion (AD) method, an ADC area is arranged directly below each area of a pixel group of at least one pixel or more. The ADC area includes an analog-digital converter (ADC) that performs A/D conversion of pixel signals of the pixel group. How to reduce the ADC area is a key factor in increasing a frame rate.

Therefore, a system with the following configuration can be mentioned. A single large driver is provided in a peripheral accessory (control) block, as a general means for guaranteeing the characteristics of a control signal line and a clock signal line. Control signals are driven by the single driver.

However, when high-speed control signals or clock signals are used, waveform rounding may occur due to a wiring load.

Therefore, a technique using a repeater element (relay device: re-drive device), which includes an intermediate buffer, so as to reduce waveform rounding caused by the wiring load has been proposed (see Patent Document 1).

CITATION LIST

Patent Document

Patent Document 1: Japanese Patent Application No. 2013-507518

SUMMARY OF THE INVENTION

Problems to be Solved by the Invention

Incidentally, in order to use the repeater element, it is conceivable to secure a region for arranging a dedicated repeater in every few ADC areas, by making each area slightly smaller than the original ADC area size to achieve tight arrangement, as in the case of an image sensor of the conventional column AD type.

However, in a case where an attempt to secure a region for arranging the repeater is made in this way, the positions of the terminals connecting the pixels and the ADC areas become different from area to area. Accordingly, the wiring pattern of a vertical transfer line (VSL) varies from ADC area to ADC area, and as a result, the characteristics vary from ADC area to ADC area.

Furthermore, securing a region for arranging a dedicated repeater will increase the ratio of the number of pixels to one ADC area. This will thus affect improvement of a frame rate.

The present disclosure has been made in view of such a situation, and particularly, intended to enable high-speed control signals and clock signals to be stably supplied.

Solutions to Problems

A solid-state imaging device according to one aspect of the present disclosure includes: a pixel chip on which pixels are disposed in an array; a plurality of area A/D conversion units that perform analog-digital (A/D) conversion of a pixel value of a pixel in a pixel group including at least one or more pixels on the pixel chip, for each area set in association with the pixel group; a control signal generation unit that generates a control signal for controlling the plurality of area A/D conversion units; and a repeater element that re-drives the control signal, in which the repeater element is regularly disposed in each area group unit including the areas of a predetermined number of at least one or more.

The repeater elements can be regularly disposed at intervals of a predetermined number of the area group units, according to a type of the control signal to be re-driven.

The repeater element can be disposed in the area.

The repeater elements can include an analog signal repeater element for an analog signal among the control signals, and a digital signal repeater element for a digital signal among the control signals. The analog signal repeater element can be disposed in an analog domain in the area. The digital signal repeater element can be disposed in a digital domain in the area.

A region for disposing the repeater element can be flipped at least either in an up-down direction or in a left-right direction in the area constituting the area group, and adjacent regions for disposing the repeater element can be aggregated in adjacent areas.

The repeater element disposed in the aggregated regions can be shared between the adjacent areas.

When the region for disposing the repeater element is flipped, a configuration on a corresponding pixel chip can also be flipped.

The repeater elements can be regularly disposed at intervals of a predetermined number of the area group units according to a demand for characteristics of each of a plurality of different types of the control signals to be re-driven.

The repeater elements can be regularly disposed at intervals of a predetermined number of the area group units in a manner to reduce a skew difference of each of a plurality of different types of the control signals to be re-driven.

An image pickup apparatus according to one aspect of the present disclosure includes: a pixel chip on which pixels are disposed in an array; a plurality of area A/D conversion units that perform analog-digital (A/D) conversion of a pixel value of a pixel in a pixel group including at least one or more pixels on the pixel chip, for each area set in association with the pixel group; a control signal generation unit that generates a control signal for controlling the plurality of area A/D conversion units; and a repeater element that re-drives the control signal, in which the repeater element is regularly disposed in each area group unit including the areas of a predetermined number of at least one or more.

An electronic device according to one aspect of the present disclosure includes: a pixel chip on which pixels are disposed in an array; a plurality of area A/D conversion units that perform analog-digital (A/D) conversion of a pixel value of a pixel in a pixel group including at least one or more pixels on the pixel chip, for each area set in association with the pixel group; a control signal generation unit that generates a control signal for controlling the plurality of area A/D conversion units; and a repeater element that re-drives the control signal, in which the repeater element is regularly disposed in each area group unit including the areas of a predetermined number of at least one or more.

According to one aspect of the present disclosure, there are included: a pixel chip on which pixels are disposed in an array; a plurality of area A/D conversion units that perform analog-digital (A/D) conversion of a pixel value of a pixel in a pixel group including at least one or more pixels on the pixel chip, for each area set in association with the pixel group; a control signal generation unit that generates a control signal for controlling the plurality of area A/D conversion units; and a repeater element that re-drives the control signal, in which the repeater element is regularly disposed in each area group unit including the areas of a predetermined number of at least one or more.

Effects of the Invention

According to one aspect of the present disclosure, it is possible to stably supply high-speed control signals and clock signals.

BRIEF DESCRIPTION OF DRAWINGS

FIG. 9 is a diagram describing an example of arrangement of repeater elements on ADC areas for each control signal set for each functional block.

MODE FOR CARRYING OUT THE INVENTION

Preferred embodiments of the present disclosure will be described below in detail with reference to the accompanying drawings. Note that in the present specification and the drawings, the same reference signs are assigned to constituent elements having substantially the same functional configuration, and redundant description is thus omitted.

<Configuration Example of Disclosed Solid-State Imaging Device>

A configuration example of an embodiment of an area analog-digital conversion (AD) type solid-state imaging device of the present disclosure will be described with reference to the block diagram of FIG. 1.

Figure 1:
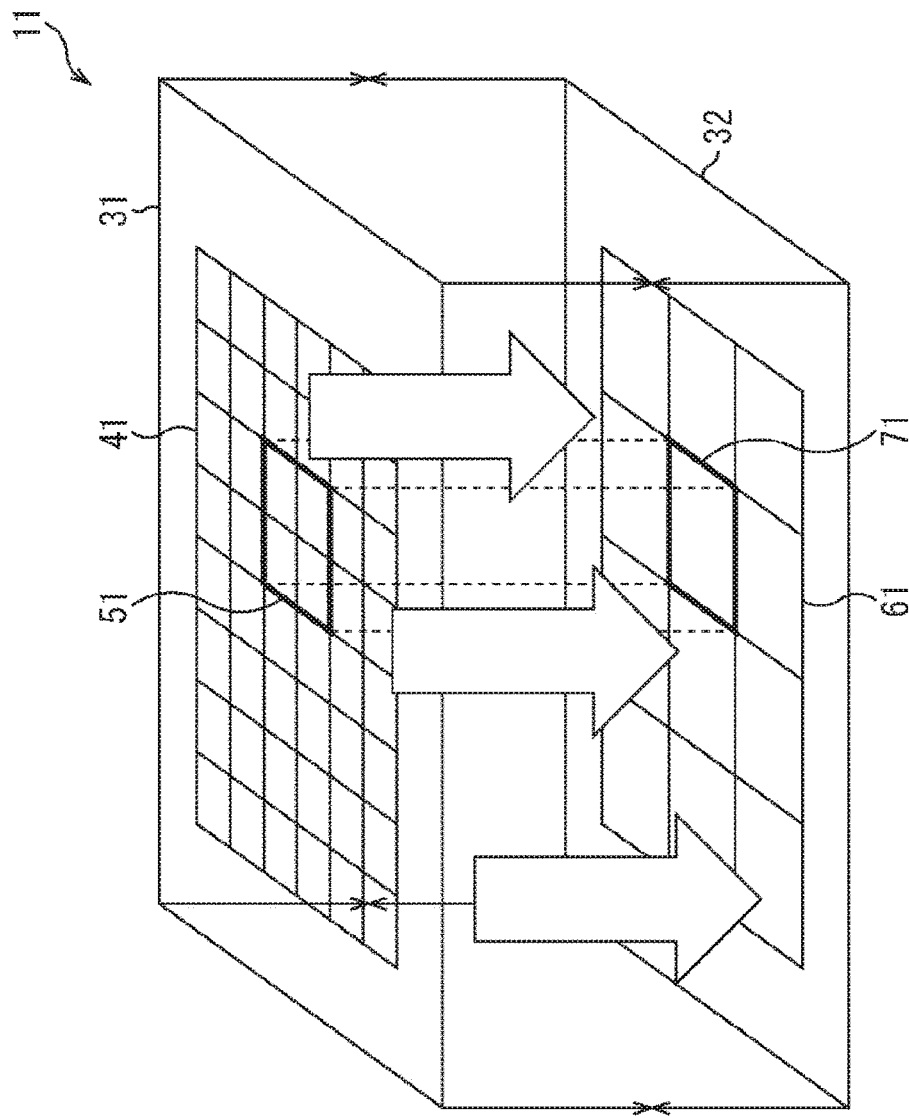
FIG. 1 is a diagram describing a configuration example of a solid-state imaging device to which the present technology has been applied.

A solid-state imaging device 11 of the area AD method shown in FIG. 1 has a configuration in which a pixel chip 31 and a circuit chip 32 are stuck together and laminated. On the pixel chip 31, one ADC area 71 is set for a pixel group 51 that includes pixels 41 of a predetermined number of at least one or more. The pixels 41 are arranged in an array. In FIG. 1, one pixel group 51 is set to include a total of four pixels of 2 pixels×2 pixels. It is shown that pixel signals of the four pixels constituting the pixel group 51 are subjected to A/D conversion in the ADC area 71.

Figure 4:
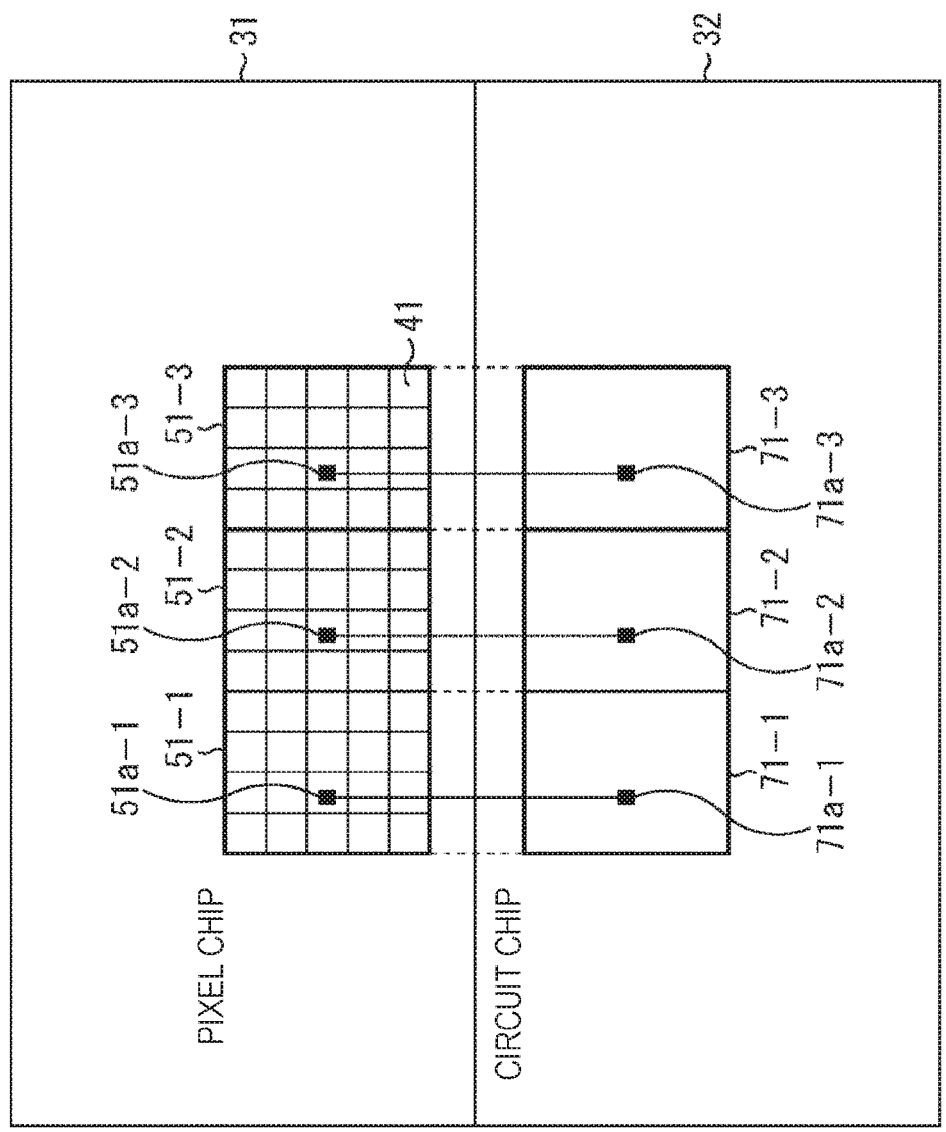
FIG. 4 is a diagram describing relationships between electrodes in pixel groups and terminals of corresponding ADC areas.

Each pixel 41 on the pixel chip 31 and an analog-digital converter (ADC) on the circuit chip 32 exchange signals and share a power supply through terminals (a CuCu pad to which a terminal 51a including Cu and 71a including Cu to be described below with reference to FIG. 4 are connected).

In the conventional solid-state imaging device, pixel signals of respective pixels in a pixel area on the pixel chip 31 are sequentially read row by row. Meanwhile, in the area AD method, a pixel area is divided into a plurality of the pixel groups 51 including a plurality of pixels. One ADC area 71 is allocated to one pixel group 51. Corresponding pixels are read in all the ADC areas 71, and subjected to A/D conversion. As a result, processing for one frame is completed. Therefore, allocating a smaller number of pixels to one ADC area 71 enables a higher frame rate.

<Control Method in Area AD Method in Solid-State Imaging Device of Present Disclosure>

Next, a control method according to the area AD method in the solid-state imaging device 11 shown in FIG. 1 will be described with reference to FIG. 2.

The circuit chip 32 includes a control block 81, an accessory block 82, and an aggregate 61 of the ADC areas 71.

The control block 81 generates control signals for controlling the ADC areas 71 provided in the aggregate 61, and supplies the control signals to the accessory block 82.

The accessory block 82 divides the control signals supplied from the control block 81 into the number of rows, in which the ADC areas 71 are arranged, by using a control logic 82a, and drives the divided control signals to the respective ADC areas 71 in a row direction, as indicated by arrows in the drawing, after adjusting skew. Furthermore, the accessory block 82 also supplies analog signals to be used in the ADC area 71.

The control signal supplied from the accessory block 82 to each ADC area 71 in the row direction is connected to all the ADC areas 71 in the row direction. Thus, an increase in the number of areas will increase a wiring load and input capacitance of an access point. Therefore, in a case where a high-speed control signal or clock signal is transmitted, there is a risk that waveform rounding may occur, and the characteristics of the signal may become unstable.

Figure 2:
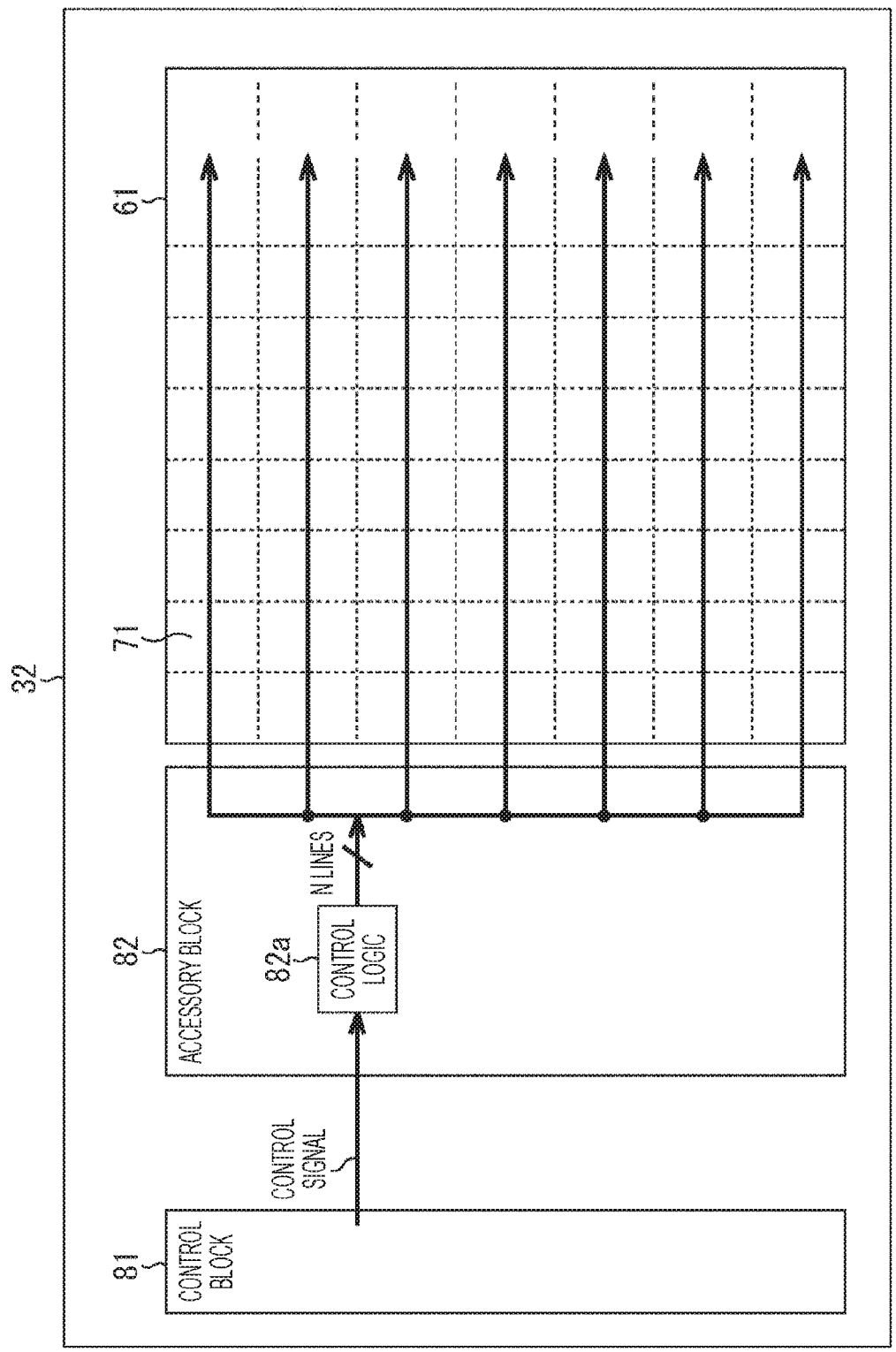
FIG. 2 is a diagram describing operation on a circuit chip shown in FIG. 1.

Note that FIG. 2 shows an example of arranging the accessory block 82 on the left side of the aggregate 61 including a group of the ADC areas 71. However, the accessory block 82 may be arranged on the right side of the aggregate 61, or may be arranged on both the right and left sides.

<Example of Configuration of ADC Area>

Next, a configuration example of the ADC area 71 will be described with reference to FIG. 3.

One ADC area 71 has the same function as the conventional column ADC, and is divided into an analog domain 101 and a digital domain 102.

The analog domain 101 is provided with a comparator 131, a control logic block 132 including a vertical transfer line (VSL), and a load MOS 133. Furthermore, the digital domain 101 is provided with a counter 121 and a sense amplifier 122.

The control logic block 132 receives, from each pixel 41 included in the pixel group 51 of the pixel chip 31 via the VSL, a pixel signal supplied via a terminal connected with the terminals 51a and 71a, and performs A/D conversion of the pixel signal by using the comparator 131, the load MOS 133, and the counter 121, as needed. The sense amplifier 122 transfers the pixel signal converted into a digital signal as a result of the A/D conversion.

<Connection of Conventional Pixel Chip and Circuit Chip>

Here, connection of the conventional pixel chip 31 and the circuit chip 32 will be described with reference to FIG. 4. In FIG. 4, pixel groups 51-1 to 51-3 including a plurality of the pixels 41 on the pixel chip 31 are arranged from left to right in the drawing. Corresponding to the arrangement of the respective pixel groups 51-1 to 51-3, the ADC areas 71-1 to 71-3 are provided on the circuit chip 32 directly below the pixel groups 51-1 to 51-3.

Then, terminals 51a-1 to 51a-3 and terminals 71a-1 to 71a-3 are provided at physically the same corresponding positions on the pixel groups 51-1 to 51-3 and the ADC areas 71-1 to 71-3, respectively. The terminals 51a-1 to 51a-3 and the terminals 71a-1 to 71a-3 each include Cu. The terminals 51a-1 to 51a-3 are connected with the terminals 71a-1 to 71a-3, respectively. Hereinafter, the connected terminals 51a-1 and 71a-1, the connected terminals 51a-2 and 71a-2, and the connected terminals 51a-3 and 71a-3, which are Cu terminals connected to each other, are each also referred to as a CuCu pad.

Furthermore, the pixel groups 51-1 to 51-3 and the ADC areas 71-1 to 71-3 are each simply referred to as the pixel group 51 and the ADC area 71 hereinafter, unless they need to be specifically distinguished from each other. The same applies to other configurations.

In other words, as shown in FIG. 4, one ADC area 71 is provided on the circuit chip 32 side for one pixel group 51 including the plurality of pixels 41 on the pixel chip 31. The positional relationship between the terminal 51a including Cu and the terminal 71a including Cu is the same in all the pixel groups 51 and the ADC areas 71.

Note that a plurality of the CuCu pads to which the terminals 51a and 71a are connected may be provided in one pixel group 51 and one ADC area 71. However, FIG. 4 shows an example of arranging just a single CuCu pad. Here, it is conceivable to insert a repeater element so as to guarantee the characteristics of a high-speed control signal. However, in the conventional area AD method, since the ADC areas 71 are laid to cover a surface under the pixel chips 31, a region for arranging a repeater element cannot be secured.

Therefore, the following technique has been proposed in the conventional column AD method. When a repeater is arranged in a column area, a column pitch is made slightly smaller than a pixel pitch shown in FIG. 4 to secure a repeater region 151 in, for example, every three columns 71'-1 to 71'-3, as shown in FIG. 5.

Figure 5:
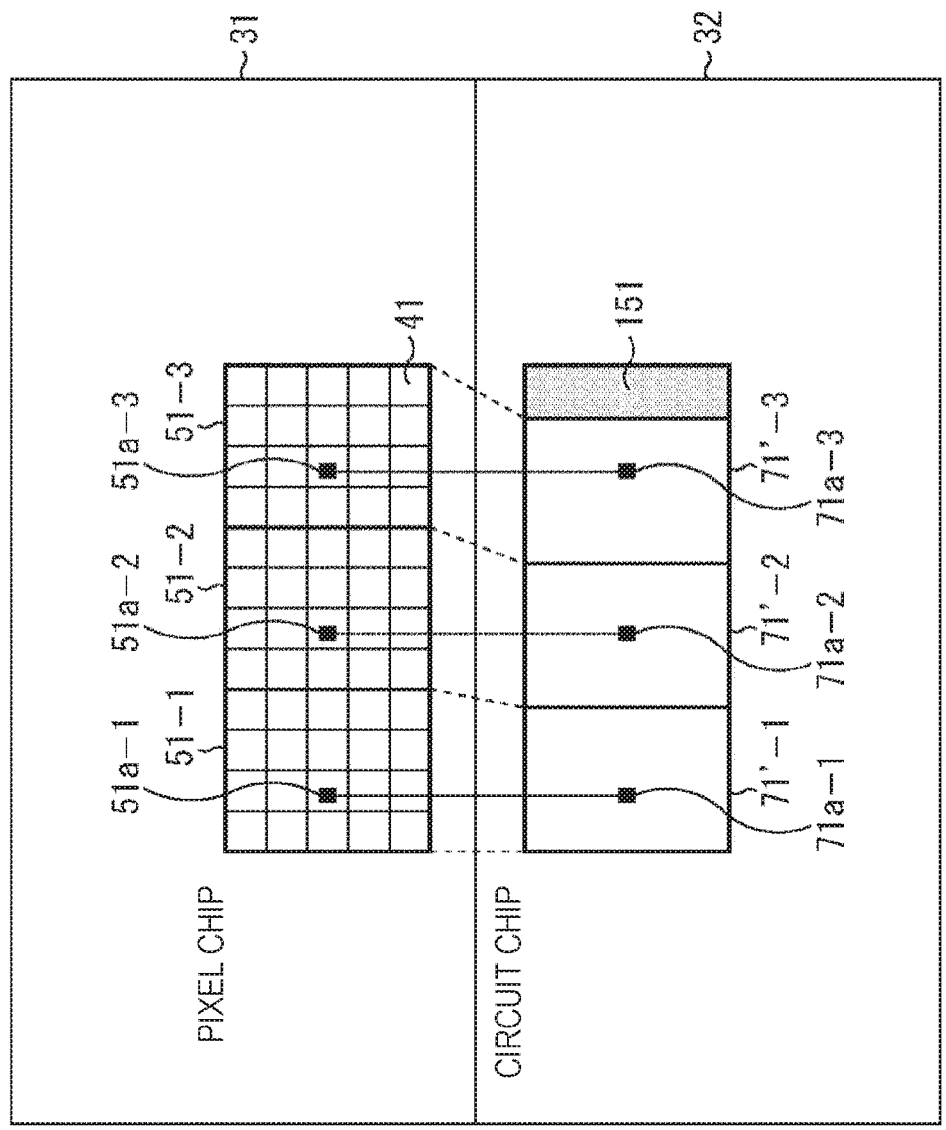
FIG. 5 is a diagram describing a conventional method of securing a repeater region.

However, in the case of using the technique shown in FIG. 5, although it is possible to secure a repeater region similarly to the column AD method, the positions of the CuCu pads, which join the terminals 51a and 71a together, become different between each ADC area 71. As a result, it is necessary to prepare a layout pattern for each ADC area 71, which is a restriction on layout in the ADC area 71.

Furthermore, there is a possibility that the size of the ADC area 71 should be increased due to the layout of the CuCu pads, which join the terminals 51a and 71a together, in some cases. Moreover, there is a risk that a difference in characteristics may be caused by a layout difference which arises for each ADC area 71.

<Connection of Pixel Chip and Circuit Chip of Present Disclosure>

Therefore, in order to resolve the above-described positional difference of the CuCu pads which join the terminals 51a and 71a together, the pixel chip 31 and the circuit chip 32 of the present disclosure are connected such that a repeater region can be set in each ADC area 71.

Figure 6:
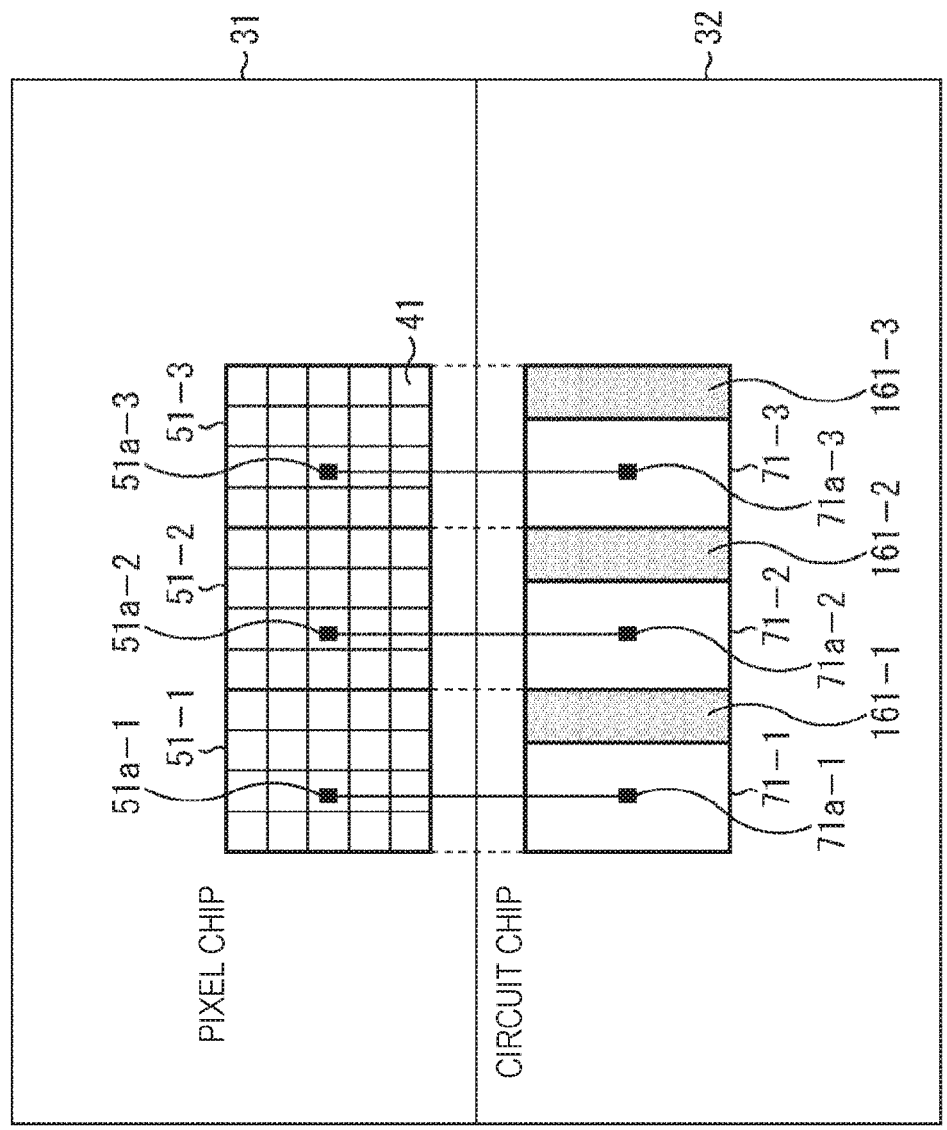
FIG. 6 is a diagram describing a method of securing a repeater region according to the present disclosure.

In other words, as shown in FIG. 6, a repeater region 161 is included in the ADC area 71, which is a region on the circuit chip 32 corresponding to the pixel group 51 on the pixel chip 31. Arrangement based on this layout is repeated as the basic configuration. This makes it possible to unify the layout configuration of each ADC area 71, and reduce a difference in characteristics between the ADC areas 71 while preventing the positional difference of the terminals 71a connected to the CuCu pads between ADC areas 71.

More specifically, in the ADC areas 71-1 to 71-3 corresponding to the pixel groups 51-1 to 51-3, respectively, repeater regions 161-1 to 161-3 for disposing a repeater element are provided, respectively, in the same layout, that is, on the right side.

Note that the repeater region 161 is provided with an analog signal repeater element 181 and a digital signal repeater element 182 which will be described below. Furthermore, the analog signal repeater element 181 and the digital signal repeater element 182 are also simply referred to as repeater elements 181 and 182 hereinafter.

<First Variation>

Figure 3:
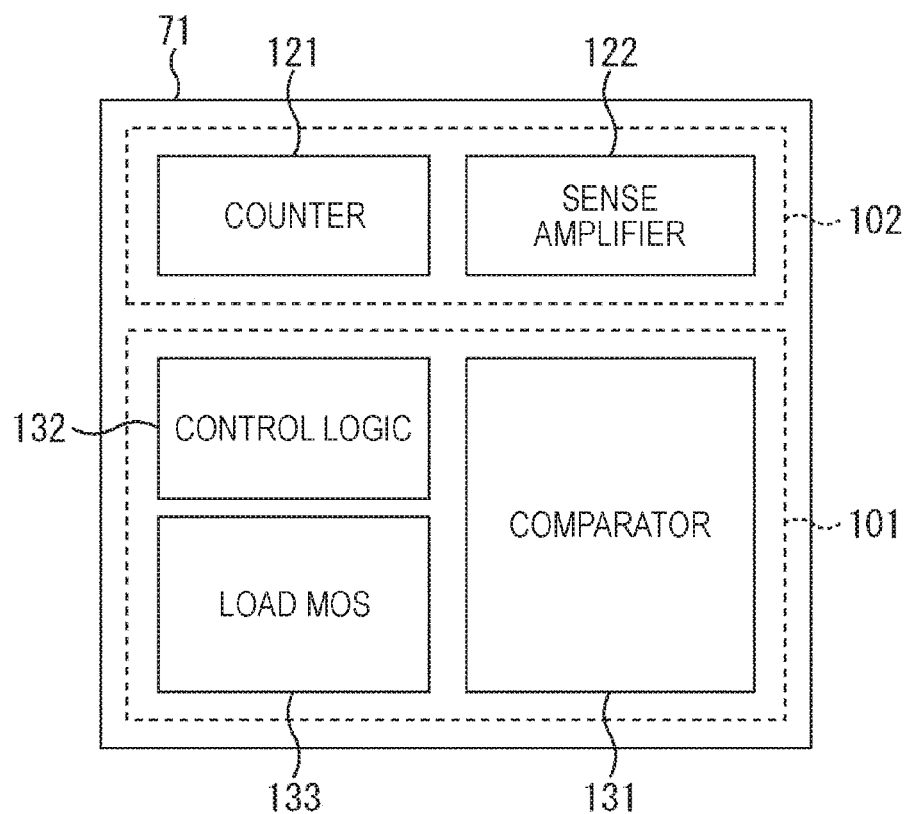
FIG. 3 is a diagram describing an ADC area shown in FIG. 1.

As shown in FIG. 3, there is a plurality of functional blocks in one ADC area 71, and it is necessary to output respective control signals required for all of them. Accordingly, the wiring density of control signal lines is higher than in the conventional column AD method.

Collectively arranging the repeater elements of the control signal lines in a predetermined region will lead to a spatial strain on the ADC area 71.

Figure 7:
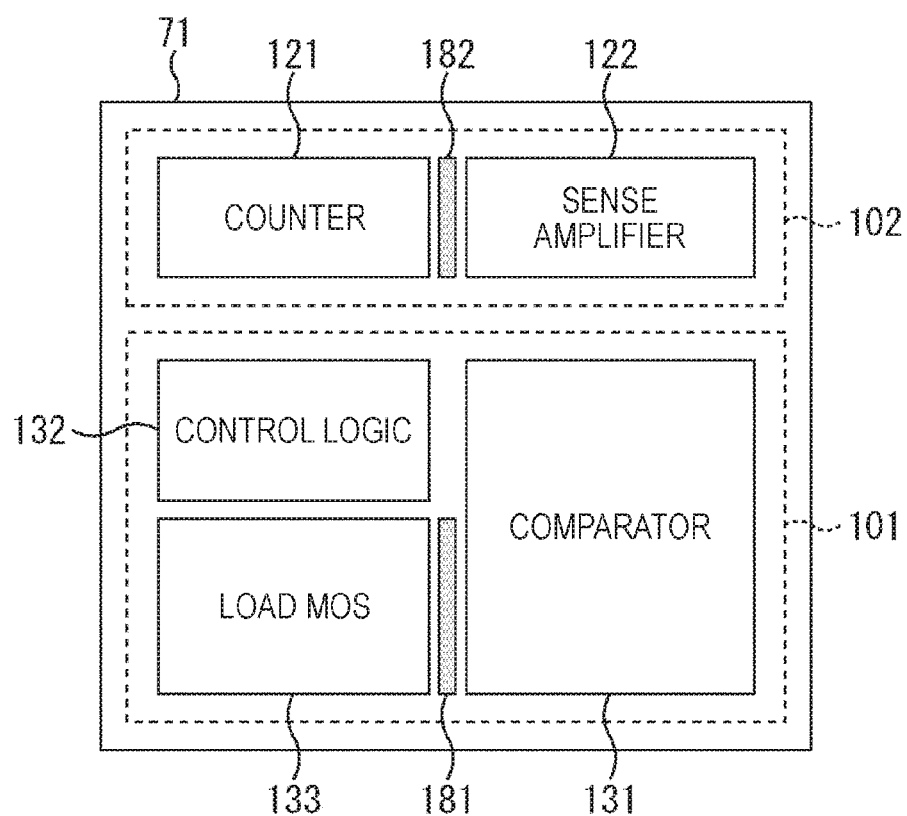
FIG. 7 is a diagram describing a configuration example of an ADC area, as a first variation.

Therefore, as shown in FIG. 7, a region for arranging the repeater element is secured in a vacant space in the ADC area 71.

In other words, in FIG. 7, an analog signal repeater element 181 is arranged between a comparator 131 and a load MOS 133 in an analog domain 101. Furthermore, a digital signal repeater element 182 is arranged between a counter 121 and a sense amplifier 122 in a digital domain 102.

With such a configuration, the analog signal repeater element 181 and the digital signal repeater element 182 are repeatedly arranged for each ADC area 71. This makes it possible to unify the layout configuration of each ADC area 71, and prevent occurrence of a difference in characteristics between the ADC areas 71 while preventing the positional difference of a terminal 71*a* with respect to a terminal 51*a* connected to a CuCu pad for each ADC area 71.

<Second Variation>

Naturally, there is no large vacant space also in an ADC area 71. Therefore, as shown in FIG. 8, it is also possible to adopt a configuration to guarantee the characteristics of a control signal line and clock wiring by arranging repeater elements for different types of control signals in every ADC areas 71 of a predetermined number, without securing a space for arranging dedicated repeater elements.

Figure 8:
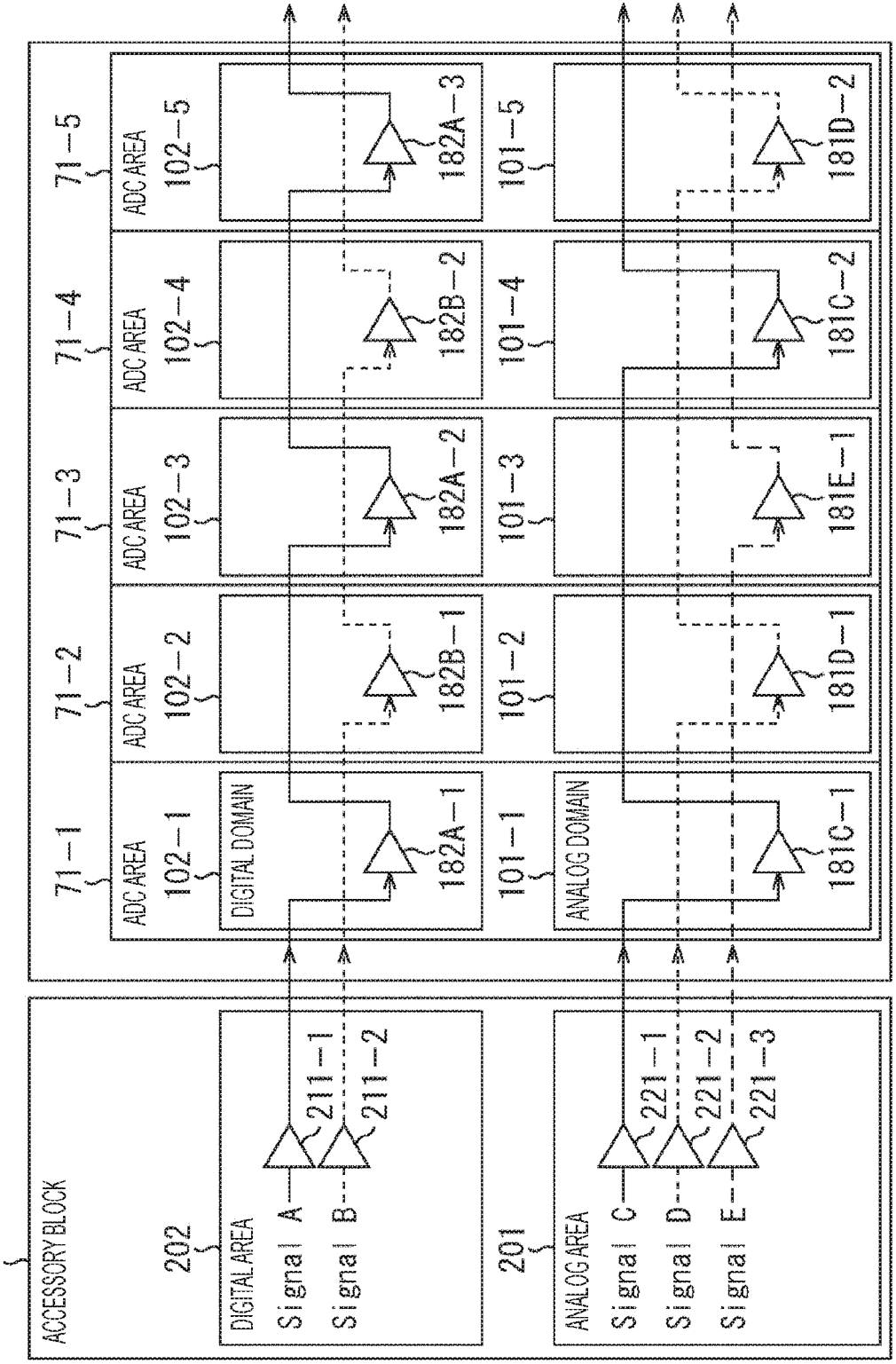
FIG. 8 is a diagram describing an example of arrangement of repeater elements set for each control signal of a plurality of different types at the time when the ADC area shown in FIG. 7 is used, as a second variation.

In other words, in FIG. 8, an accessory block 82 outputs, to ADC areas 71-1 to 71-5, control signals A and B (corresponding to Signals A and B in the drawing), which include a control signal as a digital signal, a clock signal and the like, and control signals C, D, and E (corresponding to Signals C, D, and E in the drawing), which include a control signal as an analog signal, a clock signal, and the like.

More specifically, the accessory block 82 includes an analog area 201 and a digital area 202. The digital area 202 includes drivers 211-1 and 211-2 that output (drive) the control signals A and B, respectively. Furthermore, the analog area 201 includes drivers 221-1 to 221-3 that output (drive) the control signals C to E, respectively.

In addition, the ADC areas 71-1, 71-3, and 71-5 include repeater elements 182A-1 to 182A-3 for re-driving the control signal A, provided in digital domains 102-1, 102-3, and 102-5, respectively. Moreover, the ADC areas 71-2 and 71-4 include repeater elements 182B-1 and 182B-2 for re-driving the control signal B, provided in digital domains 102-2 and 102-4, respectively.

Note that the ADC areas 71-1, 71-3, and 71-5 allow the control signal B to pass through them to their respective adjacent ADC areas 71-2 and 71-4. Similarly, the ADC areas 71-2 and 71-4 allow the control signal A to pass through them to their respective adjacent ADC areas 71-3 and 71-5.

Similarly, the ADC areas 71-1 and 71-4 include repeater elements 181C-1 and 181C-2 for re-driving the control signal C, provided in analog domains 101-1 and 101-4, respectively. Furthermore, the ADC areas 71-2 and 71-5 include repeater elements 181D-1 and 181D-2 for re-driving the control signal D, provided in analog domains 101-2 and 101-5, respectively. Moreover, the ADC area 71-3 includes a repeater element 181E-1 for re-driving the control signal E, provided in analog domain 101-3.

Note that the ADC areas 71-2 and 71-3 allow the control signal C to pass through them to the adjacent ADC area 71-4. Similarly, the ADC areas 71-1, 71-3, and 71-4 allow the control signal D to pass through them to their respective adjacent ADC areas 71-2 and 71-5. The ADC areas 71-1 and 71-2 allow the control signal E to pass through them to the adjacent ADC area 71-3.

In other words, the repeater elements 181C to 181E are arranged in every two ADC areas 71, in the analog domains 101 of the respective ADC areas 71. Furthermore, the repeater elements 182A and 182B are arranged in every other ADC area 71, in the digital domains 102 of the respective ADC areas 71.

In this manner, the repeater elements 181C to 181E relating to control signals which are analog signals are arranged in every two ADC areas 71, and the repeater elements 182A and 182B relating to control signals which are digital signals are arranged in every other ADC area 71.

As a result, for both of analog signals and digital signals, it is possible to re-drive each of a plurality of types of the control signals in every few ADC areas 71 by means of the repeater element 181 or 182, without securing a dedicated region for the repeater element for each type of the control signals.

Furthermore, it is possible to secure the characteristics of each control signal by performing re-driving at optimal intervals of the ADC areas 71 in accordance with characteristics required for each of the different control signals.

Moreover, it is also possible to reduce the output of driver cells of the drivers 211 and 221 in the accessory block 82 by arranging the repeater elements 181 and 182 at appropriate intervals of the ADC areas 71.

<Arrangement Positions of Repeater Elements>

With regard to the interval of the area number of the ADC areas 71 at which the analog signal repeater element 181 and the digital signal repeater element 182 are arranged, FIG. 8 shows an example of providing each of these repeater elements in one ADC area 71.

However, it is necessary to set an arrangement interval for arranging the analog signal repeater element 181 and the digital signal repeater element 182 to be actually mounted, according to characteristics required for each of different control signals and clock signals.

FIG. 9 shows control signal lines of each block in the ADC area 71, and an example of arranging the analog signal repeater element 181 and the digital signal repeater element 182 for each ADC area 71 in which the analog signal repeater element 181 and the digital signal repeater element 182 are provided.

In other words, FIG. 9 shows an example of arranging the analog signal repeater element 181 and the digital signal repeater element 182 for each of different types of control signals required for each of a load MOS 133, a comparator 131, and a counter 121, with respect to area numbers for identifying the ADC areas 71.

Here, FIG. 9 shows that the ADC area 71 corresponding to the area number indicated by the black dot is provided with the analog signal repeater element 181 or the digital signal repeater element 182 for a control signal of each corresponding type.

More specifically, control signals Asignal_D1, Asignal_D2, Asignal_P1, and Asignal_P2 are set in the load MOS 133. Control signals Asignal_D3, Asignal_D4, Asignal_P3, and Asignal_P4 are set in the comparator 131. Control signals Dsignal_P1, Dsignal_P2, Dsignal_P3, and Dsignal_C1 are set in the counter 121.

Here, the control signals Asignal D1 to Asignal D4 are analog signals, and are control signals including register signals. In FIG. 9, the control signals Asignal D1 to Asignal D4 are provided in the ADC areas 71 of the area numbers 23 to 26, respectively.

Furthermore, the control signals Asignal P1 to Asignal P4 are analog signals, and are control signals including pulse signals. In FIG. 9, the control signals Asignal P1 and Asignal P2 are provided in the ADC areas 71 of the area numbers 14 and 15, respectively, and also provided in the ADC areas 71 of the area numbers 28 and 29, respectively. The control signals Asignal P3 and Asignal P4 are provided in the ADC areas 71 of the area numbers 10 and 11, respectively, and are also provided in the ADC areas 71 of the area numbers 20 and 21, respectively.

Moreover, the control signals Dsignal_P1, Dsignal_P2, and Dsignal_P3 are digital signals, and are control signals including pulse signals. In FIG. 9, the control signal Dsignal_P1 is provided in the ADC areas 71 of the area numbers 13 and 25. The control signals Dsignal_P2 and Dsignal_P3 are both provided in the ADC areas 71 of the same area numbers, that is, in the ADC areas 71 of the area numbers 14 and 26.

Additionally, the control signal Dsignal_C1 is a digital signal, and is a control signal including a clock signal. In FIG. 9, the control signal Dsignal_C1 is provided in the ADC areas 71 of the area numbers 6, 12, 18, 24, and 30.

In other words, a pulse signal needs to be periodically re-driven. The frequency at which a repeater element is provided is determined by the wiring load between the ADC areas 71 and the size of the repeater element. In FIG. 9, an interval corresponding to 14 area numbers (an interval of 14 ADC areas 71) is set for analog signals, and an interval corresponding to 10 area numbers (an interval of 10 ADC areas 71) is set for digital signals.

Furthermore, for signals that require the skew differences between control signals to be equal, repeater elements in the same ADC area 71 are connected. This applies to, for example, the control signals Dsignal_P2 and Dsignal_P3 in FIG. 9.

Moreover, as the speed increases, a clock signal needs to be connected to a repeater element at a shorter cycle. Accordingly, there is set an interval corresponding to six area numbers (an interval of six ADC areas 71) in FIG. 9. Additionally, clock signals need repeater elements of an inverter configuration to be arranged so as to secure duty characteristics and the like.

Note that since register signals are at a direct current (DC) voltage level, there is no particular restriction.

From the above viewpoint, the number of repeater elements required to be arranged in one ADC area 71 is calculated from the relationship between repeater elements to be connected to the respective control signal lines. For example, one analog signal repeater element 181 and two digital signal repeater elements 182 are required in the example of arrangement of repeater elements shown in FIG. 9.

The control signal line to be output from the accessory block 82 varies from the one at a DC level, such as a register signal, to the one having severe characteristics, such as a clock signal. Furthermore, even in the case of a clock signal or a pulse signal, characteristics required by each control signal differ.

Therefore, it is possible to prevent deterioration in characteristics of control signals while easing spatial restrictions on the ADC area 71 since it is no longer necessary to provide repeater elements for all the control signals of the control signal lines in each ADC area 71 by arranging repeater elements at optimal intervals for each control signal line.

<Third Variation>

Incidentally, in the area AD method, as the number of pixels 41 allocated to a pixel group 51 corresponding to one ADC area 71 decreases, a frame rate can be increased. Accordingly, a demand for the ADC area 71 is severe, and there arises a situation securing a region for arranging repeater elements in the ADC area 71 itself becomes difficult.

Therefore, at least either analog domains 101 or digital domains 102 may be integrated by flipping of one of the adjacent upper and lower ADC areas 71 (by changing a layout) such that a repeater region can be easily secured.

Figure 10:
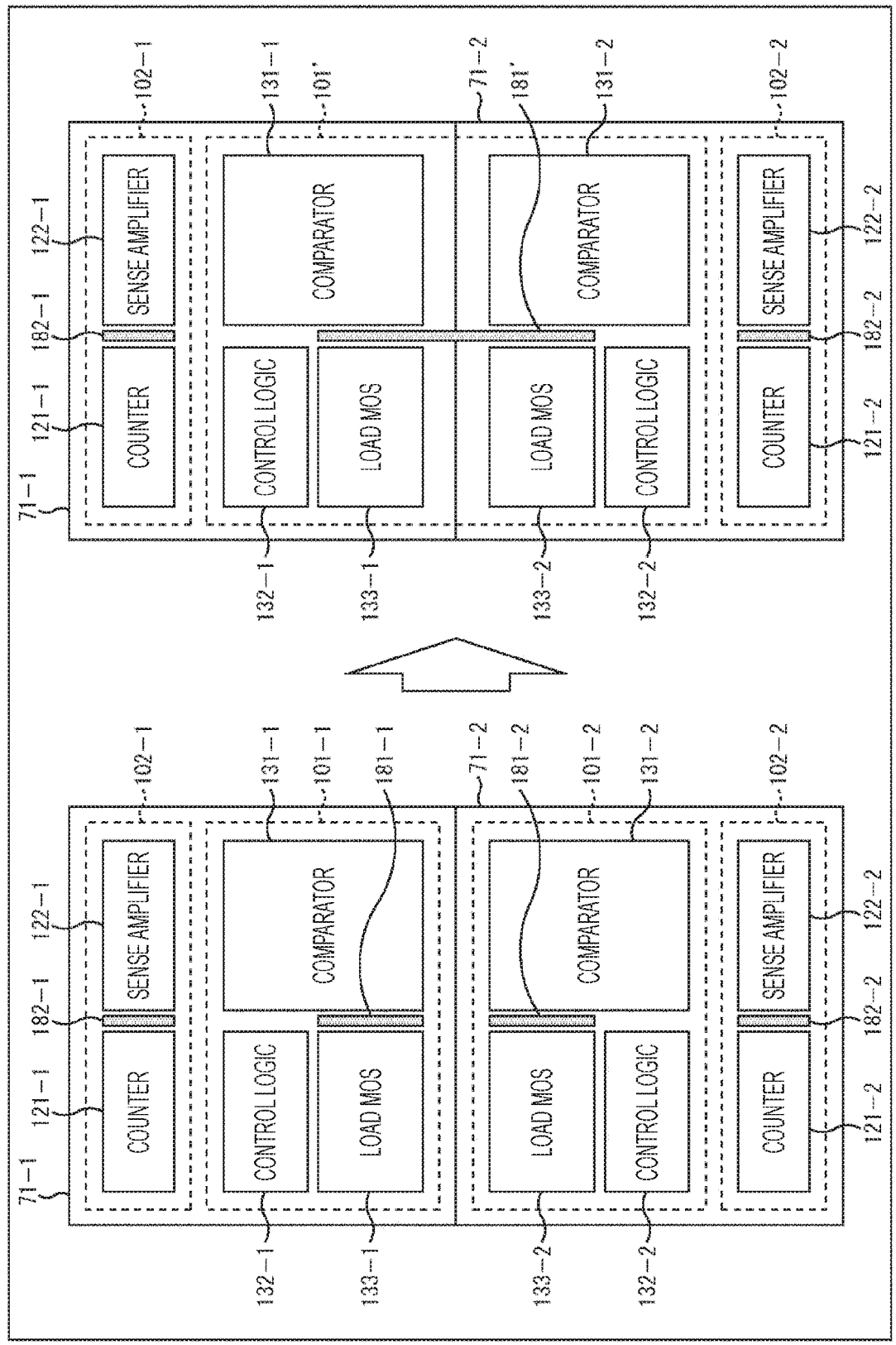
FIG. 10 is a diagram describing an example of efficiently arranging repeater elements by flipping the arrangement of upper and lower functional blocks in an ADC area, as a third variation.

For example, in a case where a layout of the ADC area 71 shown in FIG. 7 is a basic configuration, the ADC area 71-2 at the lower left of FIG. 10 has a configuration based on the layout flipped upside down (reversed upside down), and they are laid out to form an up-down mirror image in the left part of FIG. 10. With such a layout, it is possible to integrate analog domains 101-1 and 101-2 to form an analog domain 101' such that the analog domain 101' can be used in common by the upper and lower ADC areas, that is, the ADC areas 71-1 and 71-2, as shown in the right part of FIG. 10.

As a result, connecting and forming analog signal repeater elements 181-1 and 181-2 in a manner to straddle the ADC areas 71-1 and 71-2 enables an analog signal repeater element 181' to be used in common by the ADC areas 71-1 and 71-2.

Accordingly, it is possible to use a region between the ADC areas 71-1 and 71-2 without any waste, and to save space for providing the repeater element 181'.

Note that the upper and lower portions of the ADC areas 71-1 and 71-2 in FIG. 10 may be replaced so as to integrate digital domains 102-1 and 102-2 such that digital signal repeaters 182-1 and 182-2 can be used in common.

In other words, it is possible to cause the analog domain 101 and the digital domain 102 to be used in common across the ADC areas 71, by flipping a region of the ADC area 71 upside down every other row. As a result, the analog signal repeater element 181 and the digital signal repeater element 182 can be alternately arranged in every other row to be used in common. Accordingly, it is possible to make the most of the region between the ADC areas 71.

<Example of Flip of Accessory Block>

Incidentally, at the time of flipping a region of the ADC area 71, it is also necessary to flip an analog area 201 and a digital area 202 of an accessory block 82 in accordance with the flipping of the ADC area 71.

As described above, in the area ADC method, control signals of all functional blocks pass through one ADC area 71. The wiring density of control signal lines thus increases. As a result, the space between the control signal lines decreases. Accordingly, there is a concern that parasitic capacitance may occur between the control signal lines.

Therefore, when sharing a control signal itself by flipping the ADC areas 71 upside down every other row as shown in FIG. 10, it is also necessary to flip a layout in the accessory block 82.

Figure 11:
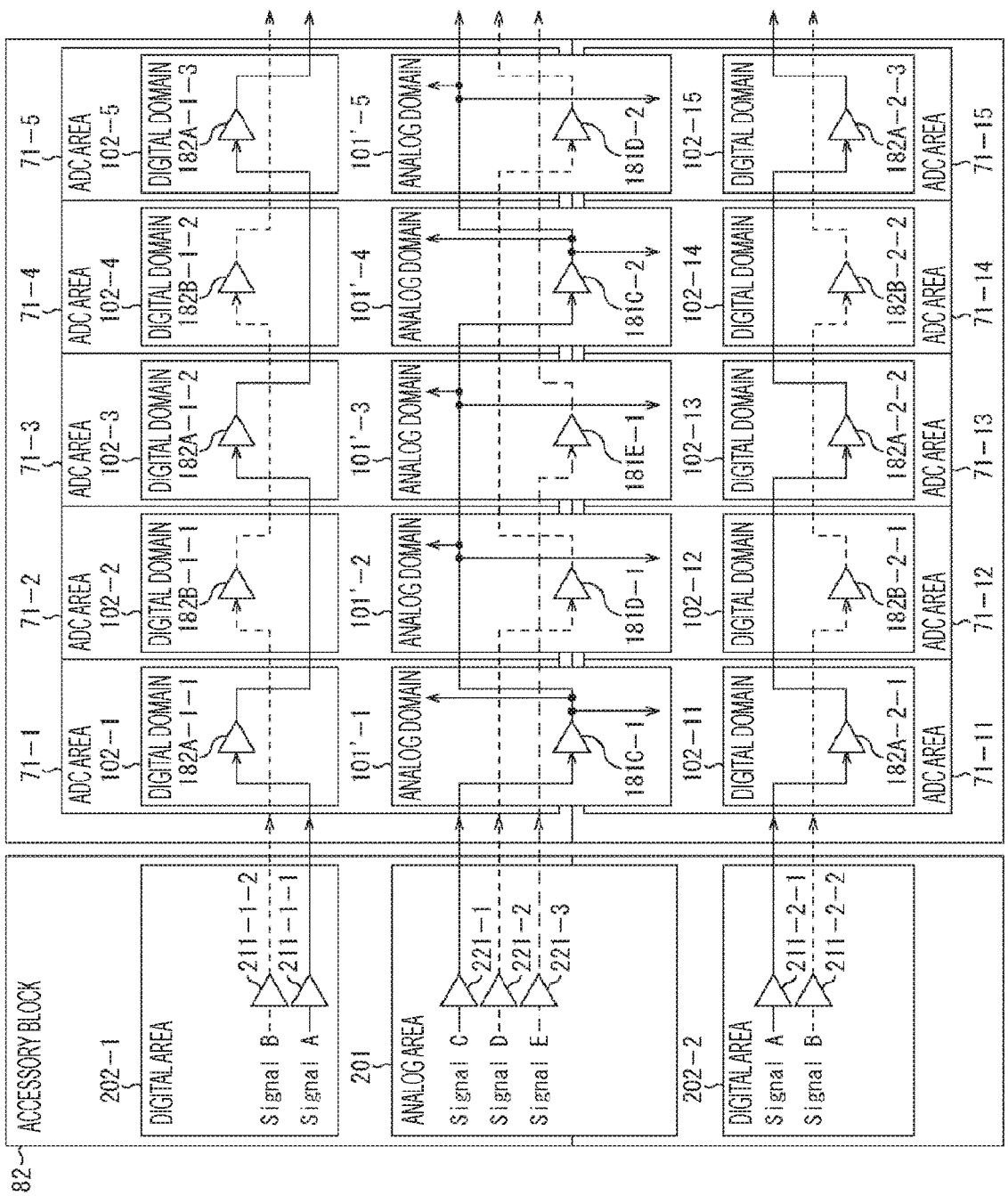
FIG. 11 is a diagram describing an example of arrangement of repeater elements set for each control signal of a plurality of different types at the time when the ADC area shown in FIG. 10 is used.

In other words, as shown in FIG. 11, ADC areas 71-1 to 71-5 are disposed in the upper part, and ADC areas 71-11 to 71-12 are arranged in the lower part. Analog domains 101'-1 to 101'-5, which are to be used in common, are provided in a manner to straddle the borders between the ADC areas 71-1 and 71-11, the ADC areas 71-2 and 71-12, the ADC areas 71-3 and 71-13, the ADC areas 71-4 and 71-14, and the ADC areas 71-5 and 71-15, respectively.

Then, digital domains 102-1 to 102-5 are provided on the upper side of the ADC areas 71-1 to 71-5, respectively. Moreover, digital domains 102-11 to 102-15 are provided on the lower side of the ADC areas 71-11 to 71-15, respectively.

At this time, the accessory block 82 is provided with a digital area 202-1, the analog area 201, and a digital area 202-2 in order from the top of the drawing.

The digital area 202-1 includes drivers 211-1-2 and 211-1-1 that output control signals B and A (Signal_B and Signal_A), in order from the top of the drawing. Furthermore, the analog area 201 includes drivers 221-1, 221-2, and 221-3 that output control signals C, D, and E (Signal_C, Signal_D, and Signal_E), in order from the top. Moreover, the digital area 202-2 includes drivers 211-2-1 and 211-2-2 that output the control signals A and B (Signal_A and Signal_B), in order from the top of the drawing.

In addition, digital signal repeater elements 182A-1-1, 182A-1-2, and 182A-1-3 that re-drive the control signal A are provided in the digital domains 102-1, 102-3, and 102-5, respectively. Then, the output of the digital signal repeater element 182A-1-1 is provided to the ADC area 71-1. The output of the digital signal repeater element 182A-1-2 is provided to the ADC area 71-3. The output of the digital signal repeater element 182A-1-3 is provided to the ADC area 71-5.

Moreover, digital signal repeater elements 182B-1-1 and 182B-1-2 that re-drive the control signal B are provided in the digital domains 102-2 and 102-4, respectively. The output of the digital signal repeater element 182B-1-1 is provided to the ADC area 71-2. The output of the digital signal repeater element 182B-1-2 is provided to the ADC area 71-4.

Furthermore, repeater elements 181C-1 and 182C-2 that re-drive the control signal C are provided in the analog domains 101'-1 and 101'-4, respectively. The output of the repeater element 181C-1 is provided to the ADC areas 71-1 and 71-11. The output of the repeater element 181C-2 is provided to the ADC areas 71-4 and 71-14.

Additionally, repeater elements 182D-1 and 182D-2 that re-drive the control signal D are provided in the analog domains 101'-2 and 101'-5, respectively. The output of the repeater element 181D-1 is provided to the ADC areas 71-2 and 71-12. The output of the repeater element 181D-2 is provided to the ADC areas 71-5 and 71-15.

Furthermore, a repeater element 182E-1 that re-drives the control signal E is provided in the analog domain 101'-3. The output of the repeater element 181E-1 is provided to the ADC areas 71-3 and 71-13.

Moreover, digital signal repeater elements 182A-2-1, 182A-2-2, and 182A-2-3 that re-drive the control signal A are provided in the digital domains 102-11, 102-13, and 102-15, respectively. Then, the output of the digital signal repeater element 182A-2-1 is provided to the ADC area 71-11. The output of the digital signal repeater element 182A-2-2 is provided to the ADC area 71-13. The output of the digital signal repeater element 182A-2-3 is provided to the ADC area 71-15.

In addition, digital signal repeater elements 182B-2-1 and 182B-2-2 that re-drive the control signal B are provided in the digital domains 102-12 and 102-14, respectively. The output of the digital signal repeater element 182B-2-1 is provided to the ADC area 71-12. The output of the digital signal repeater element 182B-2-2 is provided to the ADC area 71-14.

In other words, the analog domain 101' is shared in FIG. 11. In addition, the control signals C, D, and E are shared between the upper and lower ADC areas, that is, between the ADC areas 71-1 and 71-11, the ADC areas 71-2 and 71-12, the ADC areas 71-3 and 71-13, the ADC areas 71-4 and 71-14, and the ADC areas 71-5 and 71-15.

As described above, for each of the control signals C, D, and E, just a single control signal is provided in the upper and lower ADC areas, that is, the ADC areas 71-1 to 71-5 and the ADC areas 71-11 to 71-15. Accordingly, the number of the control signal lines to the upper and lower ADC areas 71 can be halved.

Furthermore, as shown in FIG. 11, sharing control signals enables a reduction in the number of the analog signal repeater elements 181C, 181D, and 181E as well as wires.

Moreover, the analog signal repeater elements 181C, 181D, and 181E, which have been arranged in each row thus far, only need to be arranged in every other row. As a result, it is possible to reduce total power consumption.

<Fourth Variation>

Although an example of flipping the ADC areas 71 upside down and sharing the analog signal repeater element 181 or the digital signal repeater element 182 has been described above, it is also possible to adopt a configuration in which the ADC areas 71 are further flipped left to right in every other row.

Figure 12:
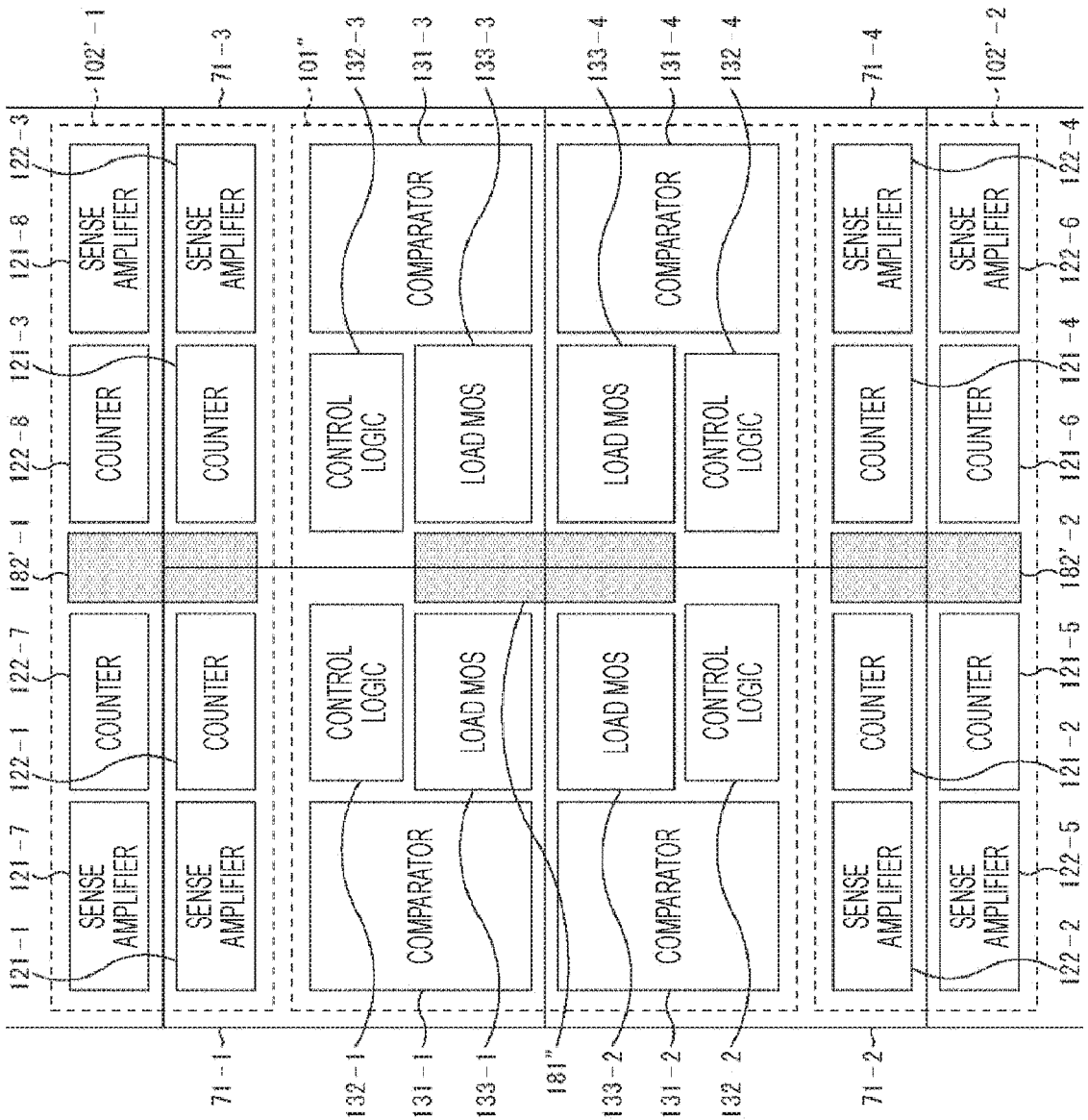
FIG. 12 is a diagram describing an example of efficiently arranging repeater elements by flipping the arrangement of upper, lower, right and left functional blocks in ADC areas, as a fourth variation.

In other words, as shown in FIG. 12, the ADC areas 71-1 to 71-4 arranged two by two in the horizontal and vertical directions may be flipped upside down and left to right such that, for example, an analog signal repeater element 181" is arranged in the center of the drawing in a centralized manner, and digital signal repeater elements 182'-1 and 182'-2 are arranged in the upper center and lower center of the drawing, respectively.

In this case, the digital signal repeater elements 182' are also arranged in a manner to be integrated with the ones provided in the adjacent ADC areas 71 arranged two by two in the horizontal and vertical directions.

Accordingly, with a layout as shown in FIG. 12, the analog signal repeater element 181" is arranged to be shared in each analog domain 101" which is an aggregation of the four analog domains 101. In addition, the digital signal repeater element 182' is arranged to be shared in a digital domain 102' which is an aggregation of the four digital domains 102.

Thus, in laying out the ADC area 71, it is possible to achieve easier layout and better area efficiency by securing a region for arranging a repeater element in a corner of the ADC area 71 rather than in the center thereof. Therefore, it is possible to share a region for arranging a single repeater element among the upper, lower, right, and left ADC areas, by locating a region for arranging each repeater element in a corner of the ADC area 71. Aggregation of repeater regions can further increase repeater arrangement efficiency. That is, it is possible to reduce the rate of the region for arranging a repeater element in the ADC area 71.

<Application Example of Flip>

Note that while an embodiment example of flipping the block configuration of the ADC area 71 has been cited in FIGS. 10 to 12, there may occur a positional difference between a terminal 51a of a pixel chip 31 and a terminal 71a of a circuit chip 32 depending on the arrangement position of a CuCu pad which join the terminals 51a and 71a together.

Figure 13:
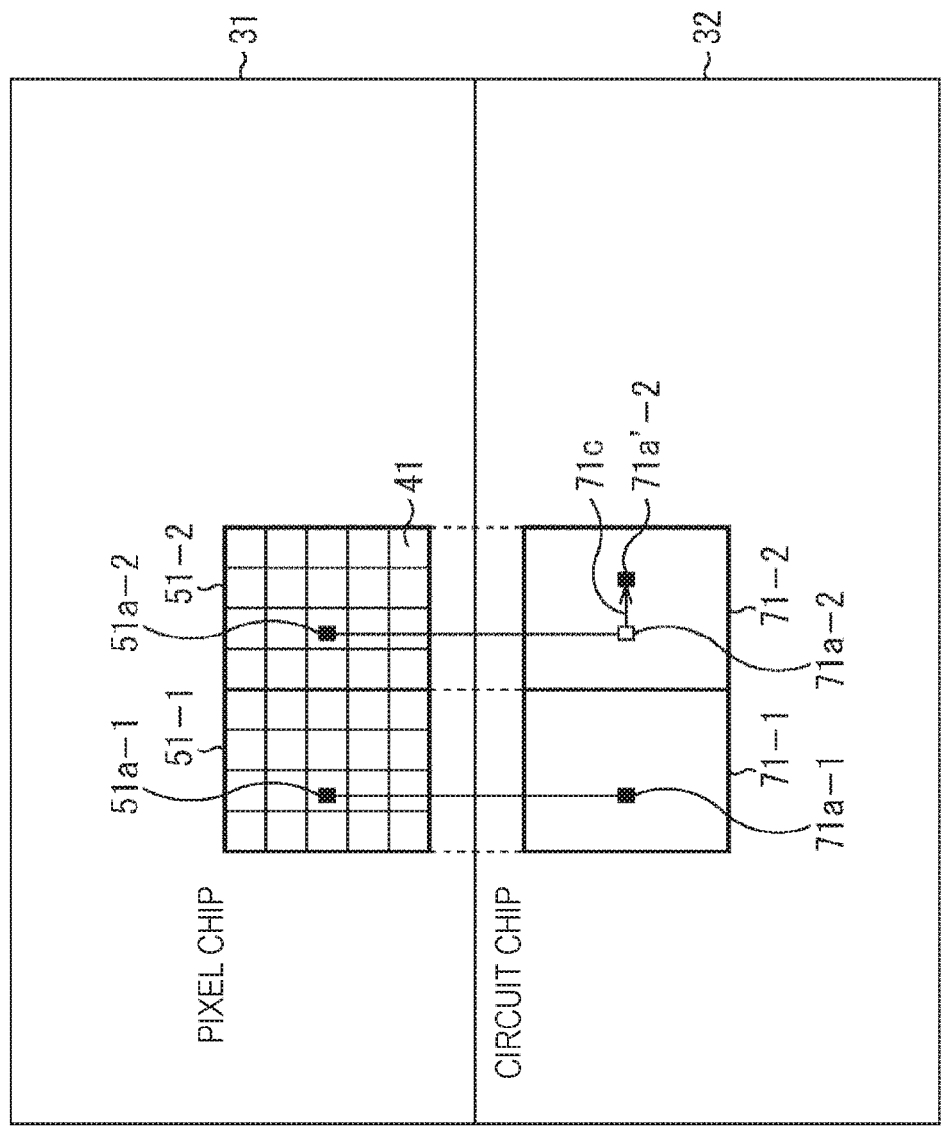
FIG. 13 is a diagram describing an example of using a lead-in wire so as to eliminate the positional difference of terminals between a pixel chip and a circuit chip at the time of flipping an ADC area.

In other words, FIG. 13 shows a configuration example of shifting a terminal 71a-2, provided at a position corresponding to a terminal 51a-2 of the pixel chip 51, to a terminal 71a'-2 corresponding to a flip position by means of a lead-in wire 71c, in the case of flipping the functional block configuration of the ADC area 71 left to right.

That is, originally, the CuCu pad is formed by connection of the terminals 51a and 71a at identical positions in the pixel group 51 and the ADC area 71. However, as a result of the left-right flipping of the functional blocks in the ADC area 71, the lead-in wire 71c is required in the ADC area 71-2 located on the right side.

Figure 14:
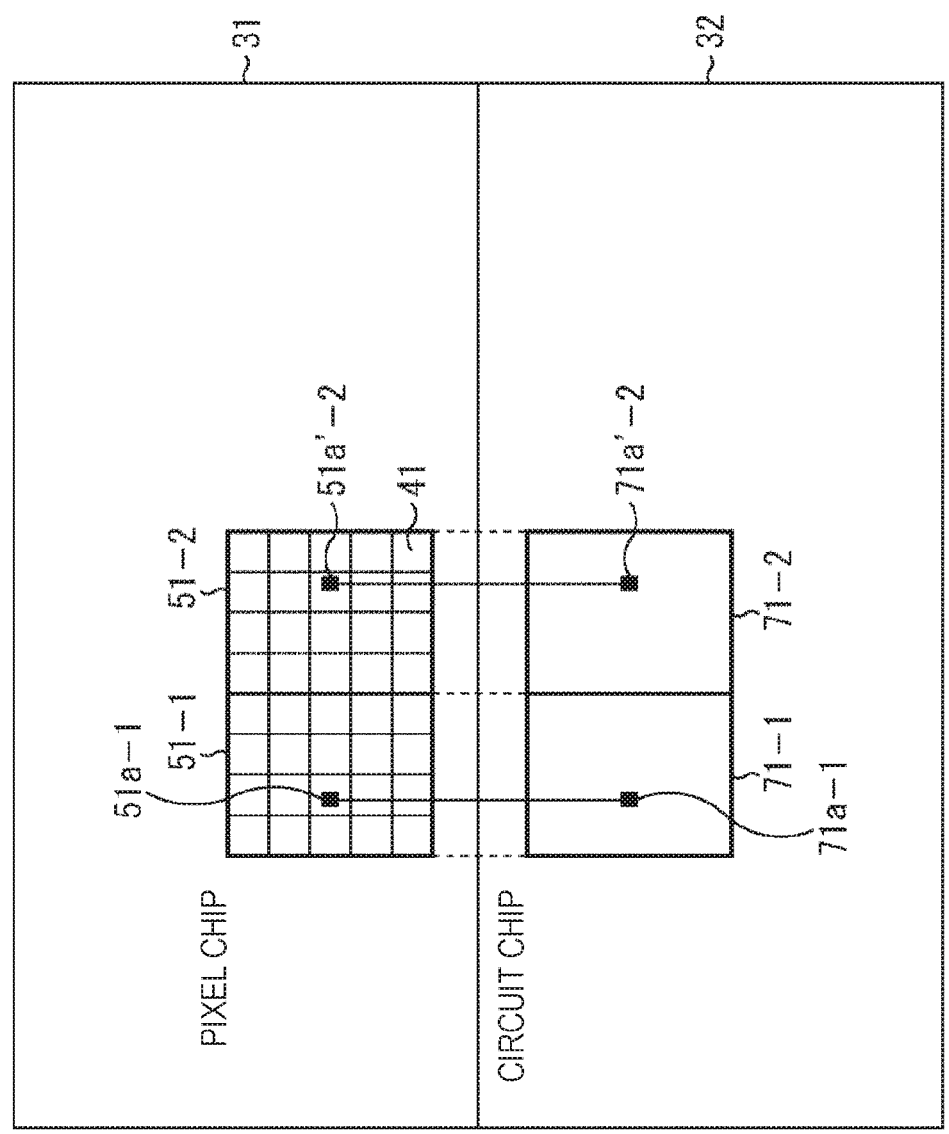
FIG. 14 is a diagram describing an example of arranging the terminals of a pixel chip and a circuit chip at the time of flipping an ADC area in an aligned manner.

Occurrence of a pattern difference in the ADC areas 71, as described above, has a risk of causing a difference in characteristics between the ADC areas 71. Therefore, in a case where the terminal 71a-2 is shifted to the terminal 71a'-2 as a result of the flipping of the functional blocks of the ADC area 71, the terminal 51a-2 on the pixel chip 51 is also flipped together, and shifted to a terminal 51a'-2, as shown in FIG. 14, to eliminate the risk.

As described above, according to the present disclosure, it is possible to reduce deterioration of a control signal that includes a clock signal at the far end of a control signal line, as compared to the case of driving by means of a large single driver in the accessory block 82. It is thus possible to easily achieve a guarantee of the characteristics of a high-speed system.

Furthermore, a control signal can be driven up to the far end of the control signal line even in the case of a large wiring load. Development to a multi-pixel system becomes possible accordingly.

Moreover, it is not necessary to use a larger driver in the accessory block 82. It is thus possible to reduce the size of the accessory block 82 and instantaneous current.

Additionally, since a region for arranging a dedicated repeater element is not necessary, it is possible to secure a larger area as the ADC area 71 than in the case of securing a region for arranging a repeater element in every few ADC area rows similarly to the column AD method. Since this is equivalent to reducing the ratio of the number of pixels to one ADC area 71, a frame rate can be increased.

Furthermore, it is possible to cause arrangement relationships between the pixel groups 51 and the ADC areas 71 to coincide with each other. This will ease restrictions on design itself. In addition, it is possible to prevent occurrence of a difference in characteristics for each ADC area 71 accordingly.

Note that an example of regularly arranging the repeater elements 181 and 182 in every few ADC areas 71 has been described above. Meanwhile, it is also possible to regularly arrange the repeater elements 181 and 182 in each range defined by a group (ADC area group) of the ADC areas 71 of a predetermined number of at least one or more.

<Example of Application to Electronic Device>

The above-described solid-state imaging device 1 is applicable to various electronic devices. Examples of the various electronic devices include an image pickup apparatus such as a digital still camera and a digital video camera, a mobile phone having an imaging function, and other devices having an imaging function.

Figure 15:
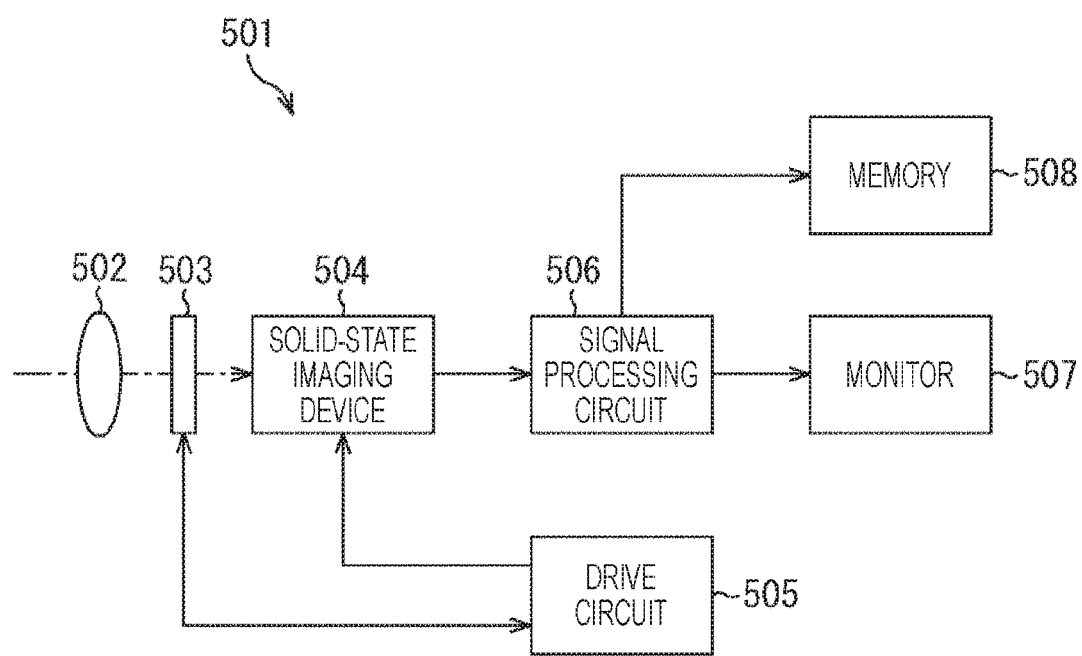
FIG. 15 is a block diagram showing a configuration example of an image pickup apparatus as an electronic device to which the present technology has been applied.

FIG. 15 is a block diagram showing a configuration example of an image pickup apparatus as an electronic device to which the present technology has been applied.

An image pickup apparatus 501 shown in FIG. 15 includes an optical system 502, a shutter device 503, a solid-state imaging device 504, a drive circuit 505, a signal processing circuit 506, a monitor 507, and a memory 508. The image pickup apparatus 501 is capable of taking still images and moving images.

The optical system 502 includes one or a plurality of lenses, and guides light (incident light) from a subject to the solid-state imaging device 504 to form an image on a light receiving surface of the solid-state imaging device 504.

The shutter device 503 is disposed between the optical system 502 and the solid-state imaging device 504, and controls a light irradiation period and a light shielding period for the solid-state imaging device 504 in accordance with control by the drive circuit 505.

The solid-state imaging device 504 includes a package including the above-described solid-state imaging device. The solid-state imaging device 504 accumulates signal charge for a certain period of time according to light imaged on the light receiving surface via the optical system 502 and the shutter device 503. The signal charge accumulated in the solid-state imaging device 504 is transferred in accordance with a driving signal (timing signal) supplied from the drive circuit 505.

The drive circuit 505 outputs driving signals for controlling the transfer operation of the solid-state imaging device 504 and the shutter operation of the shutter device 503 to drive the solid-state imaging device 504 and the shutter device 503.

The signal processing circuit 506 performs various signal processing on the signal charge output from the solid-state imaging device 504. An image (image data) obtained through the signal processing performed by the signal processing circuit 506 is supplied to the monitor 507 to be displayed, or supplied to the memory 508 to be stored (recorded).

With the image pickup apparatus 501 configured as described above, it is also possible to stably supply high-speed control signals by applying the solid-state imaging device 11 instead of the above-described solid-state imaging device 504.

<Example of Using Solid-State Imaging Device>

Figure 16:
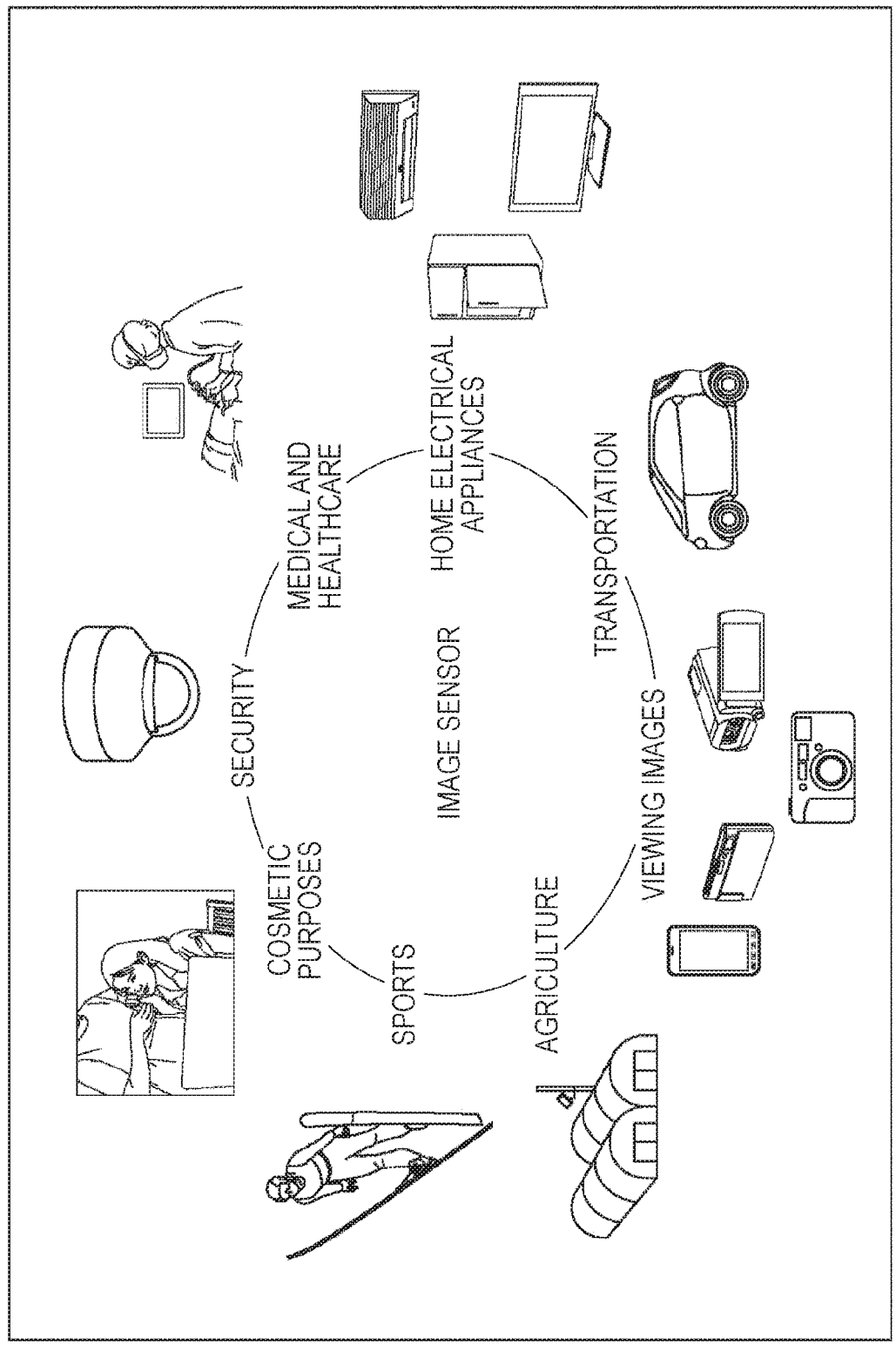
FIG. 16 is a diagram describing an example of using a solid-state imaging device to which technology of the present disclosure has been applied.

FIG. 16 is a diagram showing an example of using the above-described solid-state imaging device 11.

For example, the above-described imaging device can be used in various cases for sensing light such as visible light, infrared light, ultraviolet light, and X-rays, as described below.

An apparatus for taking images to be provided for viewing, such as a digital camera and a portable appliance with a camera function.

An apparatus to be used for transportation, such as an in-vehicle sensor for photographing the front, rear, surroundings, inside, and others of an automobile for the purpose of, for example, safe driving including an automatic stop and the like, and recognition of a driver's condition, a surveillance camera for monitoring running vehicles and roads, and a distance measuring sensor for measuring a distance between vehicles or the like.

An apparatus to be used for home electrical appliances such as a TV set, a refrigerator, and an air conditioner so as to take images of a user's gestures and operate the appliances according to the gestures.

An apparatus to be used for medical and healthcare, such as an endoscope and an apparatus for performing angiography by receiving infrared light.

An apparatus to be used for security, such as a surveillance camera for crime-prevention purposes and a camera for person authentication.

An apparatus to be used for cosmetic purposes, such as a skin measuring instrument for photographing skin and a microscope for photographing a scalp.

An apparatus to be used for sports, such as an action camera and a wearable camera for sports use or the like.

An apparatus to be used for agriculture, such as a camera for monitoring the condition of fields and crops.

Note that the present disclosure can also adopt the following configuration.

<1> A solid-state imaging device including:
a pixel chip on which pixels are disposed in an array;
a plurality of area A/D conversion units that perform analog-digital (A/D) conversion of a pixel value of a pixel in a pixel group including at least one or more pixels on the pixel chip, for each area set in association with the pixel group;
a control signal generation unit that generates a control signal for controlling the plurality of area A/D conversion units; and
a repeater element that re-drives the control signal,
in which the repeater element is regularly disposed in each area group unit including the areas of a predetermined number of at least one or more.

<2> The solid-state imaging device according to the item <1>, in which
the repeater elements are regularly disposed at intervals of a predetermined number of the area group units, according to a type of the control signal to be re-driven.

<3> The solid-state imaging device according to the item <2>, in which
the repeater element is disposed in the area.

<4> The solid-state imaging device according to the item <3>, in which
the repeater elements include an analog signal repeater element for an analog signal among the control signals, and a digital signal repeater element for a digital signal among the control signals,
the analog signal repeater element is disposed in an analog domain in the area, and
the digital signal repeater element is disposed in a digital domain in the area.

<5> The solid-state imaging device according to the item <3>, in which
a region for disposing the repeater element is flipped at least either in an up-down direction or in a left-right direction in the area constituting the area group, and adjacent regions for disposing the repeater element are aggregated in adjacent areas.

<6> The solid-state imaging device according to the item <5>, in which
the repeater element disposed in the aggregated regions is shared between the adjacent areas.

<7> The solid-state imaging device according to the item <5>, in which
when the region for disposing the repeater element is flipped, a configuration on a corresponding pixel chip is also flipped.

<8> The solid-state imaging device according to any one of the items <2> to <7>, in which
the repeater elements are regularly disposed at intervals of a predetermined number of the area group units according to a demand for characteristics of each of a plurality of different types of the control signals to be re-driven.

<9> The solid-state imaging device according to any one of the items <2> to <7>, in which
the repeater elements are regularly disposed at intervals of a predetermined number of the area group units in a manner to reduce a skew difference of each of a plurality of different types of the control signals to be re-driven.

<10> An image pickup apparatus including:
a pixel chip on which pixels are disposed in an array;
a plurality of area A/D conversion units that perform analog-digital (A/D) conversion of a pixel value of a pixel in a pixel group including at least one or more pixels on the pixel chip, for each area set in association with the pixel group;
a control signal generation unit that generates a control signal for controlling the plurality of area A/D conversion units; and
a repeater element that re-drives the control signal,
in which the repeater element is regularly disposed in each area group unit including the areas of a predetermined number of at least one or more.

<11> An electronic device including:
a pixel chip on which pixels are disposed in an array;
a plurality of area A/D conversion units that perform analog-digital (A/D) conversion of a pixel value of a pixel in a pixel group including at least one or more pixels on the pixel chip, for each area set in association with the pixel group;
a control signal generation unit that generates a control signal for controlling the plurality of area A/D conversion units; and
a repeater element that re-drives the control signal,
in which the repeater element is regularly disposed in each area group unit including the areas of a predetermined number of at least one or more.

REFERENCE SIGNS LIST

11 Solid-state imaging device
31 Pixel chip
32 Circuit chip
41 Pixel
51, 51-1 to 51-3 Pixel group
51a, 51a-1 to 51a-3 Terminal
61 Aggregate
71, 71-1 to 71-5, 71-11 to 71-15, 71'-1 to 71'-3 ADC area
71a, 73a-1 to 73a-3 Terminal
81 Control block
82 Accessory block
101, 101-1 to 101-5, 101-11 to 101-15 Analog domain
102, 102-1 to 102-5, 102-11 to 102-15 Digital domain
121 Counter
122 Sense amplifier
131 Comparator
132 Control logic
133 Load MOS
151, 161, 161-1 to 161-3 Repeater region
181, 181-1 to 181-5, 181-11 to 181-15 Analog signal repeater element
182, 182-1 to 182-5, 182-11 to 182-15 Digital signal repeater element
201, 201-1, 201-2 Analog area
202, 202-1, 202-2 Digital area
211, 211-1, 211-2, 212, 212-1, 212-2 Driver

The invention claimed is:

1. A solid-state imaging device, comprising:
a pixel chip, wherein
the pixel chip comprises pixels in an array, and
a pixel group comprises at least one pixel of the pixels;
a plurality of area analog-digital (A/D) conversion units
configured to execute A/D conversion of a pixel value of the at least one pixel in the pixel group, wherein
the plurality of area A/D conversion units is associated with a plurality of areas,
the A/D conversion is executed for an area of the plurality of areas, and
the area is associated with the pixel group;
a control signal generation unit configured to generate a plurality of control signals for control of the plurality of area A/D conversion units; and a plurality of repeater elements configured to re-drive the plurality of control signals,
  wherein the plurality of repeater elements are at intervals of a number of areas of the plurality of areas, based on a plurality of types of the plurality of control signals which is re-driven.

2. The solid-state imaging device according to claim 1, wherein
the plurality of repeater elements include:
  an analog signal repeater element for an analog signal in the plurality of control signals, and
  a digital signal repeater element for a digital signal in the plurality of control signals,
the analog signal repeater element is in an analog domain in the area, and
the digital signal repeater element is in a digital domain in the area.

3. The solid-state imaging device according to claim 1, wherein
a region for a repeater element of the plurality of repeater elements is flipped in one of an up-down direction or a left-right direction in the area, and
a plurality of adjacent regions for the repeater element are aggregated in a plurality of adjacent areas.

4. The solid-state imaging device according to claim 3, wherein
the repeater element in the aggregated plurality of adjacent regions is shared between the plurality of adjacent areas.

5. The solid-state imaging device according to claim 3, wherein
based on a flip of the region for disposition of the repeater element, a configuration of a layout on the pixel chip is flipped.

6. The solid-state imaging device according to claim 1, wherein
the plurality of repeater elements are at the intervals of the number of areas, based on a demand for characteristics of each of the plurality of types of the plurality of control signals which is re-driven, and
a first type of the plurality of types is different from a second type of plurality of types.

7. The solid-state imaging device according to claim 1, wherein
the plurality of repeater elements are at the intervals of the number of areas, that reduces a skew difference of each of the plurality of types of the plurality of control signals that is re-driven, and
a first type of the plurality of types is different from a second type of plurality of types.

8. An image pickup apparatus, comprising:
a solid-state imaging device, wherein the solid-state imaging device comprises:
  a pixel chip, wherein
    the pixel chip comprises pixels in an array, and
    a pixel group comprises at least one pixel of the pixels;
  a plurality of area analog-digital (A/D) conversion units configured to execute A/D conversion of a pixel value of the at least one pixel in the pixel group, wherein
    the plurality of area A/D conversion units is associated with a plurality of areas,
    the A/D conversion is executed for an area of the plurality of areas, and
    the area is associated with the pixel group;
  a control signal generation unit configured to generate a plurality of control signals for control of the plurality of area A/D conversion units; and
  a plurality of repeater elements configured to re-drive the plurality of control signals,
    wherein the plurality of repeater elements are at intervals of a number of areas of the plurality of areas, based on a plurality of types of the plurality of control signals which is re-driven.

9. An electronic device, comprising:
a solid-state imaging device, wherein the solid-state imaging device comprises:
  a pixel chip, wherein
    the pixel chip comprises pixels in an array, and
    a pixel group comprises at least one pixel of the pixels;
  a plurality of area analog-digital (A/D) conversion units configured to execute A/D conversion of a pixel value of the at least one pixel in the pixel group, wherein
    the plurality of area A/D conversion units is associated with a plurality of areas,
    the A/D conversion is executed for an area of the plurality of areas, and
    the area is associated with the pixel group;
  a control signal generation unit configured to generate a plurality of control signals for control of the plurality of area A/D conversion units; and
  a plurality of repeater elements configured to re-drive the plurality of control signals,
    wherein the plurality of repeater elements are at intervals of a number of areas of the plurality of areas, based on a plurality of types of the plurality of control signals which is re-driven; and
a drive circuit configured to output a driving signal to control an operation of the solid-state imaging device.

* * * * *